UNITED STATES PATENT OFFICE.

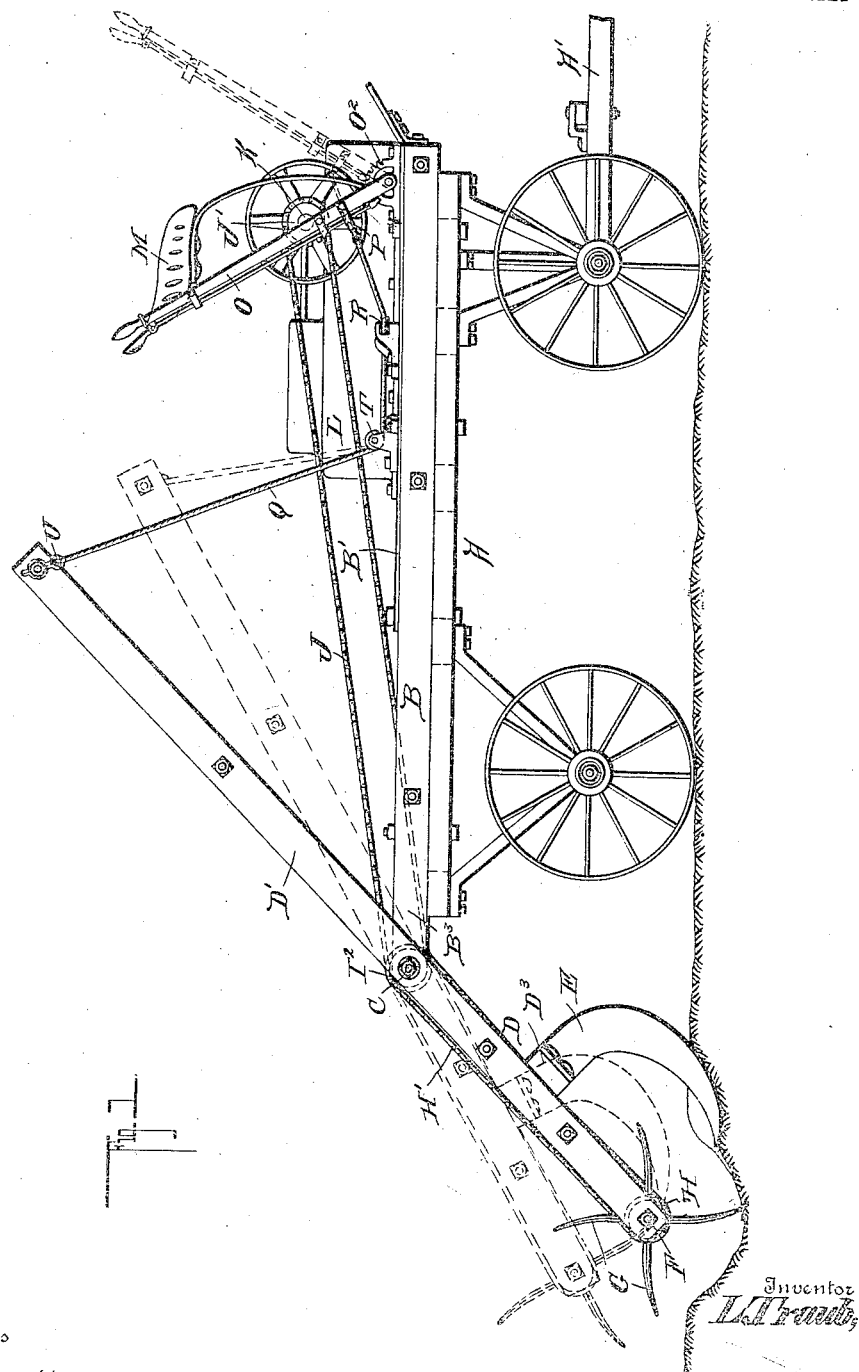

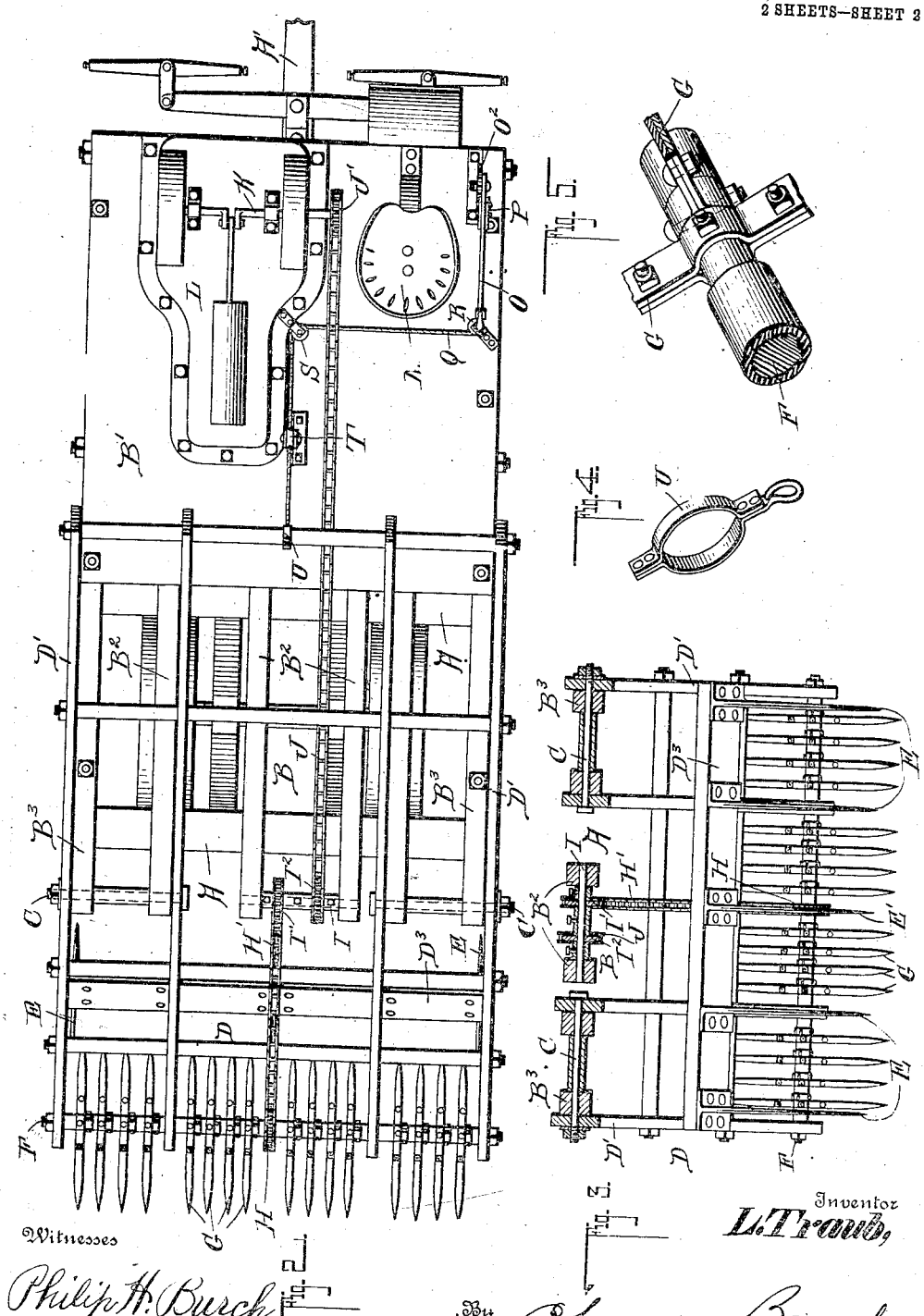

LORENZ TRAUB, OF KILBOURN, WISCONSIN.

LAND-PULVERIZER.

943,490.  Specification of Letters Patent.  Patented Dec. 14, 1909.

Application filed February 16, 1909. Serial No. 478,192.

*To all whom it may concern:*

Be it known that I, LORENZ TRAUB, a citizen of the United States, residing at Kilbourn, in the county of Columbia and State of Wisconsin, have invented a new and useful Improvement in Land-Pulverizers, of which the following is a specification.

This invention relates to certain new and useful improvements in soil pulverizers, the object being to provide a pulverizer which is so constructed that the soil will be thoroughly broken and cut up into small pieces.

Another object of my invention is to provide a machine which is drawn by horse power and one which has a gasolene engine mounted thereon for driving the pulverizing teeth whereby the same will be rotated at a high rate of speed so that the soil will be thoroughly broken up as the machine passes over the same.

A further object of the invention is to provide the pulverizer with a plurality of curved knives in advance of the pulverizing teeth so that the ground will be cut up in advance of the teeth whereby all danger of the teeth getting broken is prevented.

A still further object of my invention is to provide the pulverizer with a pivoted frame for carrying the pulverizing teeth whereby the same can be raised and lowered so that the depth of the teeth can be regulated with respect to the ground.

Another object of the invention is to provide means for operating the pivoted frame whereby the teeth can be raised so as to clear the ground in order that the pulverizer can be carried from one place to another or over a public highway.

A still further object of the invention is to provide a novel arrangement of sprocket chains for driving the pulverizing teeth whereby the swinging of the frame will not affect the same in the least so that all danger of the chains jumping the sprockets is prevented.

With these various objects in view, my invention consists in the novel features of construction, arrangement and combination of parts, all of which will be hereinafter fully described, and pointed out in the claims.

In the drawings forming a part of this specification: Figure 1 is a side elevation of my improved pulverizer showing the device in operation and in dotted lines the pivoted frame raised so as to elevate the pulverizing teeth above the ground. Fig. 2 is a top plan view of the same. Fig. 3 is a transverse section through the machine. Fig. 4 is a detail view of one of the clamps for connecting the cable to the frame and lever, and Fig. 5 is a detail view of one of the pulverizing teeth.

In carrying out my improved invention, I employ a wagon or truck A which is provided with a tongue A' carrying the ordinary doubletree to which a pair of horses can be connected, said truck having a platform frame B arranged on the same which is provided with a platform portion B' and is formed with parallel bars $B^2$ $B^3$ which extend slightly out to the rear of the truck and extending through the parallel bars $B^2$, $B^3$ are bolts C on which are pivotally mounted the parallel bars D' of a pulverizing frame D which is provided with a cross bar $D^3$ adjacent its lower end to which are connected a plurality of curved knives E and a central curved knife E' which is V-shaped in cross section, said knives being provided with flanges at their upper ends for connecting the same to the cross bar by bolts whereby the same can be readily attached or detached from the cross bar. The pulverizing frame is formed with transverse bars formed of iron tubing and extending through the longitudinal bars at the lower end of the frame is a shaft F on which are mounted a plurality of teeth G each tooth being formed of two pieces which are provided with compound bends and are adapted to fit over the shaft F and be secured thereby to bolts and the sections of the teeth are also connected together by bolts, it of course being understood that these teeth are arranged upon the shaft in different positions as clearly shown whereby all of the teeth will not be brought into engagement with the soil at one time. Fixed on the shaft F centrally is a sprocket H over which passes a sprocket chain H' which is carried by a sprocket I' fixed on a shaft I mounted in the central parallel bars $B^2$ of the frame B whereby when the shaft I is rotated the shaft carrying the teeth will also be rotated so as to cause the same to turn in such a manner that when brought into contact with the ground the soil will be thoroughly broken up. A second sprocket $I^2$ is fixed on the shaft I over which passes a sprocket chain J which is carried by a sprocket wheel J' fixed on the power shaft K of the gasolene engine L, said power shaft being provided with the ordinary flywheel and it will be seen that by this arrangement, the shaft carrying the teeth can be rotated at a high rate of speed so that the teeth will make about twenty revolutions to every revolution of the wheel of the wagon whereby the soil will be chopped up into small pieces. While I have shown and described a gasolene engine for operating the same, it is of course understood that any other suitable form of engine can be employed without departing from the spirit of my invention, and that the engine could be used for propelling the wagon.

A seat M is arranged on the platform B' opposite the power shaft alongside of which is arranged a lever O provided with a hand lever adapted to engage a segmental rack O², said lever having a clamp P connected thereto to which is connected a cable Q which passes over a pulley R and then centrally over a pulley S and under a pulley T and is connected to a clamp U fixed on the cross bar of the pulverizing frame whereby the pulverizing frame can be drawn downwardly on the platform frame by operating the lever so as to raise the pulverizing teeth above the ground in order that the pulverizer can be carried from place to place. It will be seen that by releasing the lever the frame will drop by gravity so as to allow the pulverizing teeth to be brought into engagement with the ground which holds the same in that position, but at the same time allows the same to swing upwardly when brought into contact with a rock or a stump which prevents the teeth from becoming broken and at the same time allows the frame to move up and down when traveling over rough land. It has been found by experimenting that the weight of the frame will be sufficient to hold the teeth into contact with the ground but if necessary a weight can be placed upon the pulverizing frame so as to hold the same downwardly in order that the ground might be pulverized deeper or on the other hand, other means might be employed for accomplishing this.

From the foregoing description, it will be seen that I have provided a land pulverizer which is formed of a very few parts which are so arranged and connected together that any of the parts can be readily detached in order that a new part may be inserted when one of the parts becomes broken and it will also be seen that by detaching the pulverizing frame, the wagon can be used for other purposes.

Having thus fully described my invention, what I claim as new and desire to secure by Letters Patent, is:

1. In a land pulverizer, the combination with a truck, of a platform frame mounted on said truck provided with parallel bars, bolts fixed in the outside parallel bars, a pulverizing frame mounted on said bolts carrying a shaft, teeth fixed on said shaft, a sprocket secured on said shaft, a sprocket carried by a shaft mounted in the platform frame, a sprocket chain passing over said sprockets, a second sprocket fixed on the shaft in the platform frame, and a power driving shaft mounted on the platform carrying a sprocket having a sprocket chain mounted thereover passing over the sprocket wheel arranged on the shaft mounted in the platform frame.

2. In a land pulverizer, the combination with a truck carrying a platform frame, of a gas engine mounted on said platform provided with a power shaft carrying a sprocket, a pivoted pulverizing frame carried by said platform, a shaft carried by said frame having a plurality of teeth and provided with a sprocket wheel, and sprocket chains connecting the sprocket of the power shaft to the sprocket of the shaft carrying the teeth through the medium of sprocket wheels mounted on a shaft arranged on the platform frame.

LORENZ TRAUB.

Witnesses:
E. H. ROTHE,
A. C. TENNISON.